United States Patent
Sakashita et al.

(10) Patent No.: US 8,197,688 B2
(45) Date of Patent: Jun. 12, 2012

(54) HOLLOW FIBER MEMBRANE MODULE

(75) Inventors: Daichi Sakashita, Tokyo (JP); Yoshihide Kaiya, Tokyo (JP); Masazumi Oba, Tokyo (JP); Kenichi Futami, Tokyo (JP); Junichi Hayakawa, Tokyo (JP); Lianggang Chen, Hainan (CN); Qing Chen, Hainan (CN)

(73) Assignee: Hainan Litree Purifying Tech Co., Ltd., Haikou (CN)

( * ) Notice: Subject to any disclaimer, the term of this patent is extended or adjusted under 35 U.S.C. 154(b) by 739 days.

(21) Appl. No.: 12/085,600

(22) PCT Filed: Nov. 27, 2006

(86) PCT No.: PCT/JP2006/324122
§ 371 (c)(1),
(2), (4) Date: Apr. 2, 2009

(87) PCT Pub. No.: WO2007/063998
PCT Pub. Date: Jun. 7, 2007

(65) Prior Publication Data
US 2009/0218274 A1     Sep. 3, 2009

(30) Foreign Application Priority Data
Nov. 29, 2005  (JP) .................. 2005-344662

(51) Int. Cl.
*B01D 63/00* (2006.01)
*B01D 21/24* (2006.01)
(52) U.S. Cl. ........... 210/321.8; 210/321.79; 210/321.88; 210/321.89; 210/500.23; 210/456
(58) Field of Classification Search .... 210/321.8–321.9, 210/500.24, 500.23, 456
See application file for complete search history.

(56) References Cited

U.S. PATENT DOCUMENTS

| | | | | |
|---|---|---|---|---|
| 5,151,191 A * | 9/1992 | Sunaoka et al. | ............... | 210/644 |
| 5,607,593 A * | 3/1997 | Cote et al. | ...................... | 210/650 |
| 6,203,699 B1 * | 3/2001 | Blume et al. | ............. | 210/321.81 |
| 7,160,455 B2 * | 1/2007 | Taniguchi et al. | ....... | 210/321.88 |
| 7,285,212 B2 * | 10/2007 | Arnaud | .................... | 210/321.67 |
| 7,578,940 B2 * | 8/2009 | Hashimoto et al. | ........... | 210/636 |
| 2007/0007214 A1 * | 1/2007 | Zha et al. | ...................... | 210/718 |

FOREIGN PATENT DOCUMENTS

| | | | |
|---|---|---|---|
| EP | 130555 A1 * | 7/2001 | |
| JP | 56-100605 | 8/1981 | |
| JP | 2-261522 | 10/1990 | |
| JP | 6-178918 | 6/1994 | |
| JP | 7-148421 | 6/1995 | |

* cited by examiner

OTHER PUBLICATIONS

International Search Report issued Feb. 20, 2007 in the International (PCT) Application of which the present application is the U.S. National Stage.

*Primary Examiner* — Ana Fortuna
(74) *Attorney, Agent, or Firm* — Wenderoth, Lind & Ponack, LLP (57) ABSTRACT

There is provided a hollow fiber membrane module (1) comprising: a membrane bundle (20) of a plurality of hollow fiber membranes (10); a cylindrical body (30) housing the membrane bundle (20); a fixing portion (40, 50) in which at least one end of the membrane bundle (20) is fixed to the cylindrical body (30); and a raw water outflow nozzle (34) for allowing raw water to flow out from the vicinity of the fixing portion (40). Raw water supplied into the cylindrical body (30) is allowed to permeate from the outside into the inside of each hollow fiber membrane (10). A soft potting portion (42) has, in its surface to be in contact with raw water, at least one groove (43).

9 Claims, 9 Drawing Sheets

HOLLOW FIBER MEMBRANE MODULE

This Application is a 371 of PCT/JP 2006/324122, filed Nov. 27, 2006, which claims priority of application Japan 2005-344662 filed Nov. 29, 2005.

TECHNICAL FIELD

The present invention relates to a hollow fiber membrane module, and more particularly to a hollow fiber membrane module for use in the purification of clean water, drinking water, industrial water, pure water, or the like, in the clarification of river water, seawater, or the like, in the treatment of various types of wastewater, human waste, sewage water, or the like, and in a water treatment, such as slurry condensation, of sludge or the like.

BACKGROUND ART

A membrane separation method, which involves allowing water to be treated to permeate through a separation membrane to remove components or particles from the water, is widely used in many fields, for example, in the purification of clean water, drinking water, industrial water, pure water, or the like, in the clarification of river water, sea water, or the like, in the treatment of various types of wastewater, human waste, sewage water, or the like, and in a water treatment, such as slurry condensation, of sludge or the like. Separation membranes for use in such applications are generally used in the form of a membrane module comprising a bundle of a plurality of membranes, fixed, e.g., in a case for collecting filtrate water.

Such a membrane module is required to have a large area for separation of water to be treated, to make good contact with the water, and to be capable of responding to a rapid change in the quality of the water. To address such requirements, which have a direct relationship to the quantity of water to be treated and the treatment efficiency, various types of membrane modules have been studied and put into practical use for microfiltration membranes and ultrafiltration membranes.

For example, a membrane module is known which comprises a cylindrical bundle of hollow fiber membranes, the both ends of the bundle being fixed, and a flow-straightening tube, having a large number of circular holes, disposed around one fixed end of the bundle of membranes. Water to be treated is allowed to flow into the membrane module from the circular holes (see, for example, Japanese Patent Laid-Open Publication No. H9-220446). The circular holes are also utilized as air inlets upon cleaning with air (air scrubbing) of the hollow fiber membranes.

In the hollow fiber membrane module having such a structure, however, there may occur a phenomenon (inter-fiber clogging phenomenon) of the formation of a rod-like bundle of hollow fiber membranes facing the circular holes, due to adhesion between the membranes in long-term use of the membrane module. When such a rod-like membrane bundle is formed, water to be treated hardly intrudes into the membrane bundle. Thus, this phenomenon leads to decreased filtration area and lowered filtration performance.

Further, air bubbles are likely to remain in the hollow fiber membrane module, which can cause membrane breakage. In particular, air bubbles are likely to remain in the upper end of the hollow membrane module upon air scrubbing, whereby an excessive stress is applied on the ends of the hollow membranes, causing breakage of the membranes at the ends. It is highly likely that such remaining air bubbles will cause a similar phenomenon upon reverse cleaning using filtrate water. Further, those portions of membranes on which air bubbles remain will dry and become hydrophobic. Accordingly, when filtration is resumed, water will not pass through those hydrophobic portions. Remaining air bubbles thus cause a decrease in the filtration area and a lowering of the amount of membrane-filtered water (flux).

In order to overcome such drawbacks, an immersion-type separation membrane module has been developed which comprises blind-like bundles of separation membranes, the bundles being arranged parallel to each other and fixed in a housing disposed in a water tank (see, for example, Japanese Patent Laid-Open Publication No. H5-220356). Such a separation membrane module, however, necessitates a larger installation area as compared to a cylindrical membrane module having the same filtration area. Saving of space, the inherent merit of a separation membrane module, can therefore be attained with difficulty. In addition, such a separation membrane module needs to use a large amount of cleaning chemical to clean contaminated membranes with a chemical, producing a large amount of chemical waste. This is unfavorable also in the light of increased environmental burden.

SUMMARY OF INVENTION

The present invention has been made in view of the above problems in the prior art. It is therefore a first object of the present invention to provide a hollow fiber membrane module which can reduce breakage of hollow fiber membranes due to air bubbles remaining in the membrane module and can prevent lowering of the flux due to hollow fiber membranes becoming hydrophobic.

It is a second object of the present invention to provide a hollow fiber membrane module which has excellent physical cleanability, e.g., for air scrubbing as carried out when hollow fiber membranes are contaminated and which can perform stable filtration over a long period of time.

It is a third object of the present invention to provide a hollow fiber membrane module which can reduce the flow velocity of a fast flow of raw water and prevent breakage of hollow fiber membranes due to direct contact of the raw water with the hollow fiber membranes.

It is a fourth object of the present invention to provide a hollow fiber membrane module which can enhance sealing properties with a simple structure and can facilitate removal and replacement of hollow fiber membranes.

According to a first aspect of the present invention, there is provided a hollow fiber membrane module which can reduce breakage of hollow fiber membranes and lowering of the flux due to hollow fiber membranes becoming hydrophobic. The hollow fiber membrane module comprises: a membrane bundle of a plurality of hollow fiber membranes; a cylindrical body housing the membrane bundle; a fixing portion in which at least one end of the membrane bundle is fixed to the cylindrical body; and a raw water outflow nozzle for allowing raw water to flow out from the vicinity of the fixing portion. Raw water supplied to the cylindrical body is allowed to permeate from the outside into the inside of each hollow fiber membrane. The fixing portion has, in its surface to be in contact with raw water, at least one groove.

With such a construction, air bubbles that accumulate in the cylindrical body during filtration or air scrubbing can be collected in the groove formed in the fixing portion and can be effectively discharged. This can significantly reduce breakage of the hollow fiber membranes due to air bubbles remaining in the cylindrical body and lowering of the flux due to the hollow fiber membranes becoming hydrophobic.

The at least one groove may be formed in a resin fixing portion in which the end of the membrane bundle is fixed with a resin to the cylindrical body, or may be formed in a soft potting portion formed of a soft material in order to prevent breakage of the hollow fiber membranes in the vicinity of the fixing portion. It is possible to prepare the fixing portion having the at least one groove, and to fix it to the cylindrical body together with the hollow fiber membranes.

In order to facilitate discharge of the above-described air babbles, it is preferred that at least part of the at least one groove of the fixing portion communicate with the raw water outflow nozzle. In other words, it is preferred that at least part of the at least one groove of the fixing portion be connected to the raw water outflow nozzle. In this case, in order to discharge air bubbles more effectively, at least part of the at least one groove of the fixing portion is preferably inclined toward the raw water outflow nozzle. Further, the at least one groove of the fixing portion may be comprised of a main groove and a plurality of branch grooves connected to the main groove. In this case, the main groove functions as an air bubble reservoir even when all the air bubbles remaining in the cylindrical body cannot be discharged. This can significantly reduce breakage of the hollow fiber membranes and lowering of the flux due to the hollow fiber membranes becoming hydrophobic.

According to a second aspect of the present invention, there is provided a hollow fiber membrane module which has excellent physical cleanability, e.g., for air scrubbing as carried out when hollow fiber membranes are contaminated and which can perform stable filtration over a long period of time. The hollow fiber membrane module comprises: a membrane bundle of a plurality of hollow fiber membranes; a cylindrical body housing the membrane bundle; and a fixing portion in which the end of that side of the membrane bundle, to which raw water is to be supplied, is fixed to the cylindrical body. Raw water supplied into the cylindrical body is allowed to permeate from the outside into the inside of each hollow fiber membrane. The fixing portion includes a plurality of through-slits, and a plurality of fixed membrane bundle portions extending approximately parallel to the through-slits.

According to a third aspect of the present invention, there is provided a hollow fiber membrane module which has excellent physical cleanability, e.g., for air scrubbing as carried out when hollow fiber membranes are contaminated and which can perform stable filtration over a long period of time. The hollow fiber membrane module comprises: a membrane bundle of a plurality of hollow fiber membranes; a cylindrical body housing the membrane bundle; and a fixing portion in which the end of that side of the membrane bundle, to which raw water is to be supplied, is fixed to the cylindrical body. Raw water supplied into the cylindrical body is allowed to permeate from the outside into the inside of each hollow fiber membrane. The fixing portion includes a plurality of evenly-spaced plate-like fixed membrane bundle portions, and a plurality of through-slits extending approximately parallel to the membrane bundle portions.

According to a fourth aspect of the present invention, there is provided a hollow fiber membrane module which has excellent physical cleanability, e.g., for air scrubbing as carried out when hollow fiber membranes are contaminated and which can perform stable filtration over a long period of time. The hollow fiber membrane module comprises: a membrane bundle of a plurality of hollow fiber membranes; a cylindrical body housing the membrane bundle; and a fixing portion in which the end of that side of the membrane bundle, to which raw water is to be supplied, is fixed to the cylindrical body. Raw water supplied into the cylindrical body is allowed to permeate from the outside into the inside of each hollow fiber membrane. The fixing portion includes a plurality of through-slits arranged approximately parallel to each other, and a plurality of fixed membrane bundle portions, each lying between two adjacent through-slits and extending approximately parallel to the through-slits.

According to a fifth aspect of the present invention, there is provided a hollow fiber membrane module which has excellent physical cleanability, e.g., for air scrubbing as carried out when hollow fiber membranes are contaminated and which can perform stable filtration over a long period of time. The hollow fiber membrane module comprises: a membrane bundle of a plurality of hollow fiber membranes; a cylindrical body housing the membrane bundle; and a fixing portion in which the end of that side of the membrane bundle, to which raw water is to be supplied, is fixed to the cylindrical body. Raw water supplied into the cylindrical body is allowed to permeate from the outside into the inside of each hollow fiber membrane. The fixing portion includes a plurality of through-slits arranged approximately parallel to each other, and a plurality of fixed membrane bundle portions, each lying between two adjacent through-slits and extending over the full length of at least one of the adjacent through-slits.

With such constructions, raw water or cleaning air can be introduced into the cylindrical body through the through-slits of the fixing portion. Further, with the construction described above, large air bubbles can be formed upon air scrubbing and, in addition, the air bubbles can be uniformly brought into contact with the entire membrane bundle. This can significantly increase the cleaning efficiency. When the hollow fiber membranes are subjected to reverse cleaning with filtrate water, sludge or the like will peel off the hollow fiber membranes. With the through-slits formed parallel to the membrane bundle portions, as described above, the peeled sludge can be efficiently discharged through the through-slits with little sludge remaining above the fixing portion.

A porous structure having a large number of pores may be disposed in the vicinity of a raw water inflow nozzle for allowing the raw water to flow into the cylindrical body or of a raw water outflow nozzle for allowing the raw water to flow out from the vicinity of the fixing portion. The provision of such a porous structure can make the flow of raw water in the cylindrical body more uniform. It is preferred not to form pores in that area of the porous structure which faces the raw water inflow nozzle in order to prevent direct contact of the raw water from the raw water inflow nozzle with the hollow fiber membranes.

In this case, though the porous structure may be one which is detachable from the cylindrical body, the porous structure is preferably formed integrally with the cylindrical body. In other words, the porous structure is preferably formed in the cylindrical body. The structure of the hollow fiber membrane module can be simplified by thus integrating the porous structure with the cylindrical body. Further, the integration can avoid the formation of a step by the porous structure. This can avoid breakage of an oscillating hollow fiber membrane due to its contact with such a step.

Preferably, the fixing portion fixes the end of the membrane bundle with a resin to the porous structure of the cylindrical body. With this structure, when the membrane bundle is fixed to the cylindrical body, the resin will enter the holes of the porous structure. This can strongly bond the membrane bundle to the cylindrical body, thereby increasing the strength of the hollow fiber membrane module.

According to a sixth aspect of the present invention, there is provided a hollow fiber membrane module which can reduce the flow velocity of a fast flow of raw water and prevent breakage of hollow fiber membranes due to direct contact of the raw water with the hollow fiber membranes. The hollow fiber membrane module comprises: a membrane bundle of a plurality of hollow fiber membranes; a cylindrical body housing the membrane bundle; and a fixing portion in which at least one end of the membrane bundle is fixed to the cylindrical body. Raw water supplied into the cylindrical body is allowed to permeate from the outside into the inside of each hollow fiber membrane. The hollow fiber membrane module is provided with a passage extending between the cylindrical body and the membrane bundle in the circumferential direction of the cylindrical body, and a raw water inflow nozzle, extending in the tangential direction of the cylindrical body, for allowing the raw water to flow into the passage.

According to a seventh aspect of the present invention, there is provided a hollow fiber membrane module which can reduce the flow velocity of a fast flow of raw water and prevent breakage of hollow fiber membranes due to direct contact of the raw water with the hollow fiber membranes. The hollow fiber membrane module comprises: a membrane bundle of a plurality of hollow fiber membranes; a cylindrical body housing the membrane bundle; and a fixing portion in which at least one end of the membrane bundle is fixed to the cylindrical body. Raw water supplied into the cylindrical body is allowed to permeate from the outside into the inside of each hollow fiber membrane. The hollow fiber membrane module is provided with a raw water inflow nozzle extending in the tangential direction of the cylindrical body and having a flow passage which gradually extends in the longitudinal direction of the cylindrical body while maintaining a constant cross-sectional area.

With such constructions, there is no need to separately provide a porous structure to reduce the flow velocity of a fast flow of raw water supplied from a raw water inflow nozzle. Direct contact of raw water with the hollow fiber membranes can be prevented even when the hollow fiber membrane module is used in cross-flow filtration. This can prevent breakage of the hollow fiber membranes which would be caused by direct contact of the flow of raw water, supplied from a raw water inflow nozzle, with the hollow fiber membranes.

In this case, a protrusion is preferably provided in the passage so as to create a swirl flow of the raw water. The protrusion creates a swirl flow of raw water in the passage, whereby the raw water can flow relatively uniformly in the cylindrical body.

According to an eighth aspect of the present invention; there is provided a hollow fiber membrane module which can enhance sealing properties with a simple structure and can facilitate removal and replacement of hollow fiber membranes. The hollow fiber membrane module comprises: a membrane bundle of a plurality of hollow fiber membranes; a cylindrical body housing the membrane bundle; a fixing portion in which at least one end of the membrane bundle is fixed to the cylindrical body; and a cover connected to at least one end of the cylindrical body. Raw water supplied into the cylindrical body is allowed to permeate into the hollow fiber membranes. A sealing member is provided outside or inside the cylindrical body for sealing between the cylindrical body and the cover.

With such a construction, even when the cover is somewhat displaced axially due to pressurization in the hollow fiber membrane module, the sealing member can keep contact with the outer or inner circumferential surface of the cylindrical body, thus securely keeping sealing between the cylindrical body and the cover. Further, the cover can be connected to the cylindrical body, not by such a method as screwing or adhesion, but by a simple method as clamping, thus enabling simplification of the structure of the hollow fiber membrane module. Further, when the cover is connected to the cylindrical body by such a method as clamping, displacement or removal of the hollow fiber membranes can be performed by displacing or removing only the cylindrical body. This facilitates displacement or removal of the hollow fiber membranes.

In this case, a sealing member housing portion for housing the sealing member is preferably formed in the outer or inner circumferential surface of the cylindrical body.

The hollow fiber membrane module of the present invention has the following advantages:

(1) The present membrane module hardly suffers from lowering of the performance due to inter-fiber clogging.

(2) Effective air scrubbing of surfaces of the hollow fiber membranes can be performed.

(3) Air bubbles remaining in the cylindrical body can be effectively discharged, thereby preventing breakage of the hollow fiber membranes and lowering of the flux due to the hollow fiber membranes becoming hydrophobic.

(4) The frequency of reverse cleaning and chemical cleaning of the hollow fiber membranes can be significantly reduced. This can not only reduce the frequency of operational stops for maintenance of the membrane module but can also significantly reduce the amount of waste water or chemical waste produced during cleaning of the membrane bundle, thus reducing the environmental burden.

DETAILED DESCRIPTION OF THE INVENTION

Preferred embodiments of the hollow fiber membrane module of the present invention will now be described in detail with reference to FIGS. 1 through 12. In FIGS. 1 through 12, the same or equivalent elements are given the same reference numerals and a duplicate description thereof will be omitted.

Figure 1:
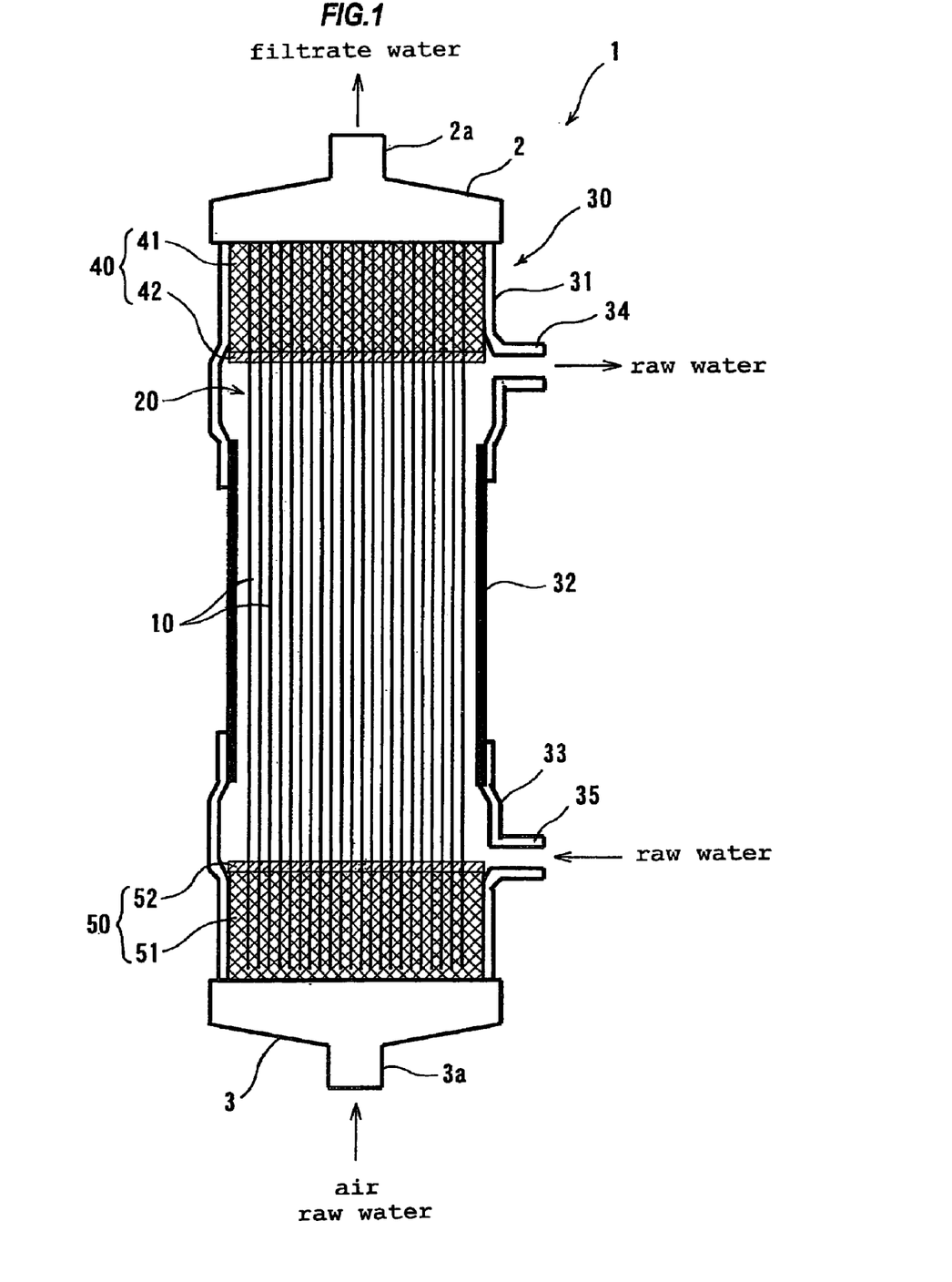
FIG. 1 is a vertical sectional view of a hollow fiber membrane module according a first embodiment of the present invention.

FIG. 1 is a vertical sectional view of a hollow fiber membrane module 1 according a first embodiment of the present invention. As shown in FIG. 1, the hollow fiber membrane module 1 includes a cylindrical membrane bundle 20 of a large number of hollow fiber membranes 10, and a cylindrical body 30 housing the membrane bundle 20. The cylindrical body 30 of this embodiment comprises an upper casing 31, an intermediate casing 32 and a lower casing 33. An upper cover 2, having a nozzle 2*a* for discharging filtrate water, is mounted to the upper end of the cylindrical body 30, while a lower cover 3, having a nozzle 3*a* for introducing air during air scrubbing, or raw water, is mounted to the lower end of the cylindrical body 30.

This hollow fiber membrane module 1 can be used for external-pressure filtration in which raw water supplied into the cylindrical body 30 is allowed to permeate from the outside into the inside of each hollow fiber membrane 10. This hollow fiber membrane module 10 can be used both for normal-flow filtration in which the whole amount of raw water supplied into the cylindrical body 30 is filtered and for cross-flow filtration in which filtration is carried out while allowing raw water to move at a certain speed along the surfaces of the hollow fiber membranes 10.

Both ends of the membrane bundle 20 are fixed with a resin to the cylindrical body 30 and, in the embodiment shown in FIG. 1, are formed an upper-end fixing portion 40 in which the upper end of the membrane bundle 20 is fixed to the upper casing 31, and a lower-end fixing portion 50 in which the lower end of the membrane bundle 20 is fixed to the lower casing 33. In the outer circumferential surface of the upper casing 31 is mounted a raw water outflow nozzle 34 for allowing raw water or reverse-cleaning waste water to flow out from the vicinity of the upper-end fixing portion 40. In the outer circumferential surface of the lower casing 33 is mounted a raw water inflow nozzle 35 for allowing raw water to flow into the cylindrical body 30 or for allowing reverse-cleaning waste water to flow out of the cylindrical body 30.

The upper-end fixing portion 40 comprises a resin fixing portion 41 solidified with a resin, and a soft potting portion 42 of a soft material. The soft potting portion 42 is formed on that side of the resin fixing portion 41 which makes contact with raw water. Similarly, the lower-end fixing portion 50 comprises a resin fixing portion 51 solidified with a resin, and a soft potting portion 52 of a soft material. The soft potting portion 52 is formed on that side of the resin fixing portion 51 which makes contact with raw water.

The soft potting portion 42 of the upper-end fixing portion 40 and the soft potting portion 52 of the lower-end fixing portion 50 are to protect the membrane bundle 20 so that the hollow fiber membranes 10 may not break due to their oscillation upon inflow of raw water or air scrubbing. Though there is no particular limitation on the material of the soft potting portions 42, 52, it is preferred to use a material having high chemical stability, such as a silicon rubber, a nitrile rubber, a butyl rubber or a fluororubber. Chemical cleaning of the hollow fiber membranes 10 is carried out when the performance of the hollow fiber membranes 10 is lowered due to adhesion of a contaminant. Deterioration of the soft potting portions 42, 52 by a chemical used in the chemical cleaning, for example, an oxidizing agent such as sodium hypochlorite, an alkali such as sodium hydroxide or an acid such as hydrochloric acid or oxalic acid, is less likely to occur when a material having high chemical stability as described above is used for the soft potting portions 42, 52. Though in the embodiment shown in FIG. 1 the soft potting portions 42, 52 are formed over the entire cross-sectional area of the cylindrical body 30, it is also possible to cover each hollow fiber membrane 10 with the above-described soft material. The same effect as described above can be attained also in this case.

Figure 2:
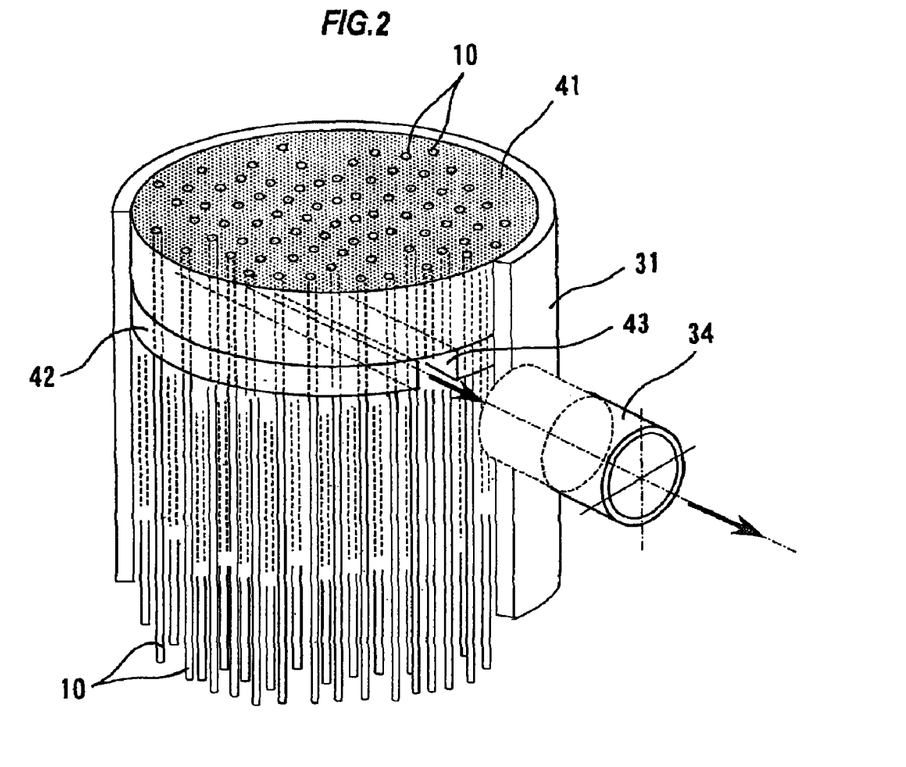
FIG. 2 is a perspective view, partly broken away, of an upper end of the hollow fiber membrane module shown in FIG. 1.
Figure 3:
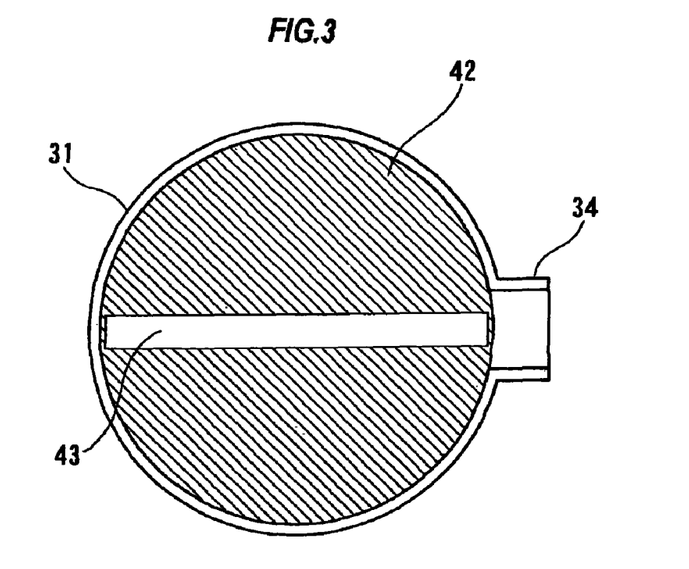
FIG. 3 is a cross-sectional view of a soft potting portion shown in FIG. 2.

FIG. 2 is a perspective view, partly broken away, of the upper end of the hollow fiber membrane module 1 shown in FIG. 1, and FIG. 3 is a cross-sectional view of the portion shown in FIG. 2. As shown in FIGS. 2 and 3, the soft potting portion 42 of the upper-end fixing portion 40 of this embodiment has, in its portion to be in contact with raw water, a groove 43 extending in the radial direction of the casing 31. The groove 43 extends toward the raw water outflow nozzle 34 provided in the upper casing 31 and communicates at the end with the flow passage of the raw water outflow nozzle 34. The groove 43 has the function of discharging air bubbles that accumulate in the upper end portion of the cylindrical body 30 during filtration of raw water or air scrubbing. The air bubbles that accumulate in the cylindrical body 30 during filtration of raw water or air scrubbing can be collected in the groove 43, and the collected air bubbles can be effectively discharged. This can significantly reduce breakage of the hollow fiber membranes 10 and lowering of the flux due to the hollow fiber membranes 10 becoming hydrophobic.

The depth of the groove 43 is preferably about 5 to 20 mm, more preferably about 10 to 15 mm. If the groove 43 is shallower that the above range, the function of discharging air bubbles or the function as an air bubble reservoir may be poor. The area of the bottom of the groove 43 is preferably about 5 to 25%, more preferably about 15 to 20% of the cross-sectional area of the resin fixing portion 41. If the area of the bottom of the groove 43 is larger than the above range, the packing density of the hollow fiber membranes 10 or the effective membrane area can be too small, which may undesirably result in a considerable decrease in the flux of the hollow membrane module.

Figure 4A:
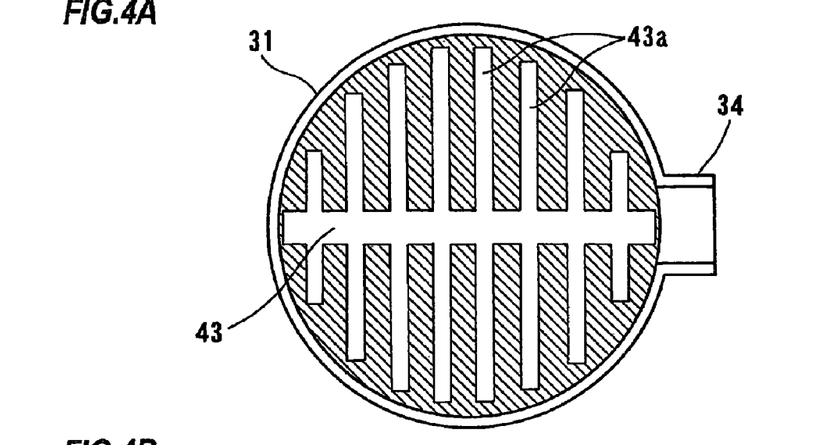
FIGS. 4A through 4C are cross-sectional views showing various grooves formed in the soft potting portion shown in FIG. 3.
Figure 4B:
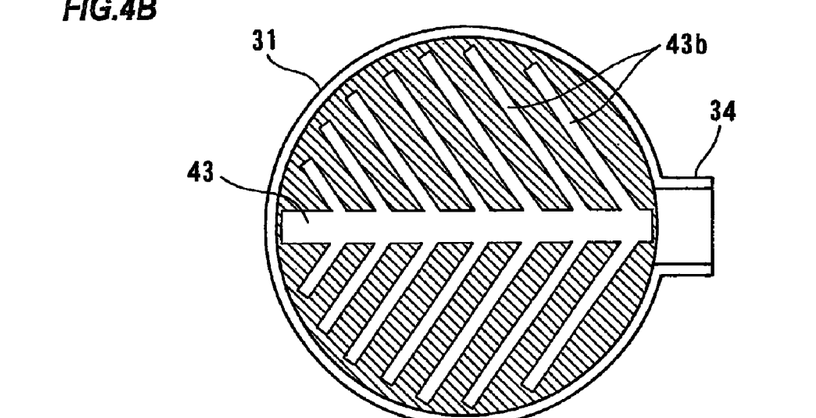

Though FIG. 3 illustrates the sole formation of the groove 43 extending toward the raw water outflow nozzle 34, it is possible to form various forms of grooves in that surface of the soft potting portion 42 which makes contact with raw water. For example, in addition to the main groove 43, it is possible to form a plurality of branch grooves 43*a* communicating with the main groove 43 and extending orthogonally to the main groove 43, as shown in FIG. 4A. Alternatively, as shown in FIG. 4B, it is possible to form a plurality of branch grooves 43*b*, communicating with the main groove 43, which are oblique to the main groove 43 and inclined toward the raw water outflow nozzle 34. According to the embodiment shown in FIG. 4A, the lengths of the branch grooves 43*a* can be made shorter as compared to the embodiment shown in FIG. 4B, whereby air bubbles present in the branch grooves 43*a* can be discharged to the main groove 43 in a shorter time. On the other hand, because the branch grooves 43*b* of the embodiment shown in FIG. 4B are inclined toward the raw water outflow nozzle 34, air bubbles present in the branch grooves 43*b* can be discharged effectively to the raw water outflow nozzle 34.

Figure 4C:
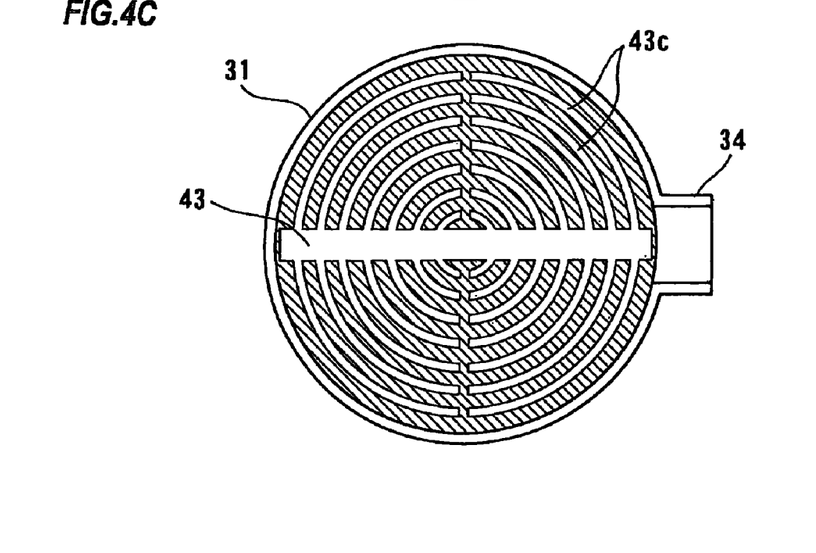

Alternatively, as shown in FIG. 4C, it is also possible to form a plurality of concentric circular branch grooves 43*c* communicating with the main groove 43. With such a groove configuration, air bubbles present in the branch grooves 43*c* can be discharged smoothly without stagnation. In the embodiment shown in FIG. 4C, the semicircular branch grooves 43*c* are formed symmetrically with respect to the center line perpendicular to the main groove 43.

According to the grooves formed in the fixing portion 40, shown in FIGS. 4A through 4C, which are comprised of the main groove 43 and the branch grooves connected to the main groove 43, the main groove 43 functions as an air bubble reservoir even when all the air bubbles remaining in the cylindrical body 30 cannot be discharged. This can significantly reduce breakage of the hollow fiber membranes 10 and lowering of the flux due to the hollow fiber membranes 10 becoming hydrophobic. In the respective embodiments shown in FIGS. 4A through 4C, the distances between adjacent branch grooves are preferably made approximately equal. This can efficiently collect air bubbles, present in various portions of the hollow fiber membranes 10, into the branch grooves or the main groove.

Though in the above-described embodiments the grooves are formed in the soft potting portion 42, such grooves may be formed in any surface insofar as it makes contact with raw water. For example, grooves may be formed in the resin fixing portion 41 when the soft potting portion 42 is not provided. It is also possible to prepare a fixing portion with grooves formed therein, and to fix the fixing portion, together with the hollow fiber membranes 10, to the upper casing 31.

Figure 5:
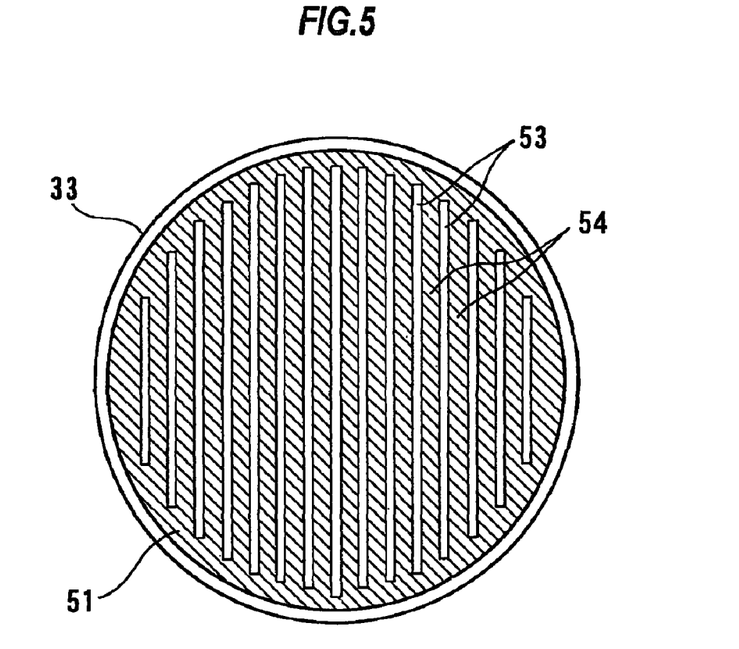
FIG. 5 is a cross-sectional view of a lower fixing portion shown in FIG. 1.

FIG. 5 is a cross-sectional view of the resin fixing portion 51 of the lower-end fixing portion 50, shown in FIG. 1. As shown in FIG. 5, a plurality of through-slits 53, extending approximately parallel to each other in one direction, are formed in the resin fixing portion 51, whereby a plurality of membrane bundle portions 54, extending approximately parallel to each other in one direction, are formed between the through-slits 53. Similar through-slits to those of the resin fixing portion 51 are formed in the soft potting portion 52 of the lower-end fixing portion 50. Upon air scrubbing, air introduced from the nozzle 3a of the lower cover 3 is introduced through the through-slits 53 of the resin fixing portion 51 and the through-slits of the soft potting portion 52 into the cylindrical body 30. By arranging the through-slits 53 and the membrane bundle portions 54 alternately at regular intervals, as described above, the membrane bundle portions 54 of hollow fiber membranes can be arranged each in a plate-like form. This can increase the efficiency of air scrubbing and, in addition, can effectively prevent inter-fiber clogging.

With the through-slits formed in the lower-end fixing portion 50, raw water, depending on its properties, can be introduced not only from the raw water inflow nozzle 35 but can also be introduced from below the lower-end fixing portion 50 through the through-slits 53 of the resin fixing portion 51 and the through-slits of the soft potting portion 52 into the cylindrical body 30.

Figure 6A:
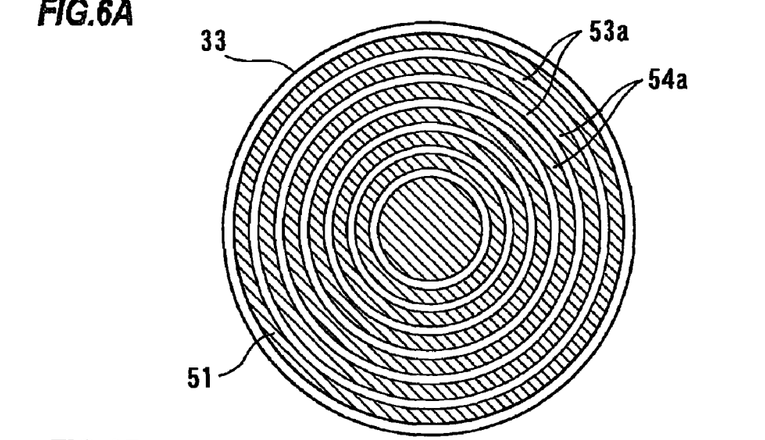
FIGS. 6A through 6C are cross-sectional views showing variations of the lower fixing portion shown in FIG. 5.

The construction of the resin fixing portion 51 is not limited to that shown in FIG. 5. For example, as shown in FIG. 6A, it is possible to form a plurality of concentric circular through-slits 53a, arranged approximately parallel to each other, and form a plurality of concentric circular membrane bundle portions 54a, arranged approximately parallel to each other, between the circular through-slits 53a. In this case, from the viewpoint of effective discharge of air bubbles, it is preferred to form concentric circular grooves, as shown in FIG. 4C, corresponding to the through-slits 53a, in the soft potting portion 42 of the upper-end fixing portion 40.

Figure 6B:
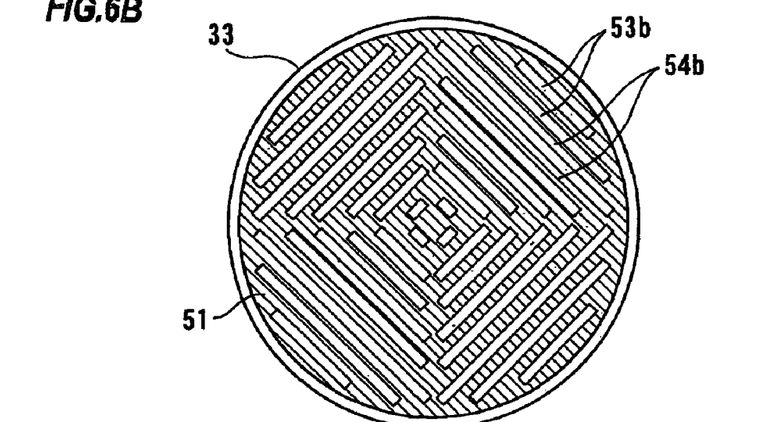
Figure 6C:
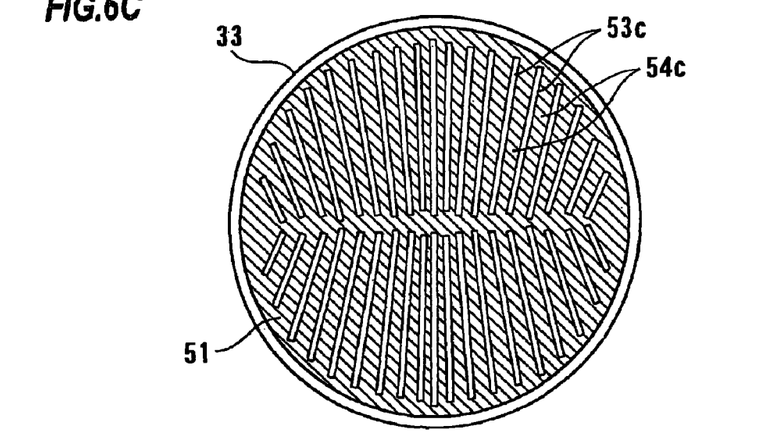

Alternatively, as shown in FIG. 6B, it is possible to form a plurality of through-slits 53b extending approximately linearly and approximately parallel to each other, and form a plurality of membrane bundle portions 54b, extending approximately linearly and approximately parallel to each other, between the through-slits 53b. Alternatively, as shown in FIG. 6C, it is possible to form a plurality of through-slits 53c extending approximately radially and approximately parallel to each other, and form a plurality of membrane bundle portions 54c, extending approximately radially and approximately parallel to each other, between the through-slits 53c.

The aperture ratio of through-slits can be increased by arranging the through-slits and the membrane bundle portions alternately at predetermined intervals, as shown in FIG. 5 and FIGS. 6A through 6C, thereby increasing the efficiency of air scrubbing. In the resin fixing portions 51 shown in FIG. 5 and FIGS. 6A through 6C, each membrane bundle portion lies between two adjacent through-slits, and extends over the full length of at least one of the adjacent through-slits. Further, the through-slits and the membrane bundle portions are arranged symmetrically with respect to a center line passing the center of the lower casing 33. In the respective regions on both sides of the center line, the through-slits are arranged parallel to each other, with the distances between the center lines of the through-slits being approximately equal. The center line of a through-slit refers to a line extending longitudinally over the full length of the slit and centrally with respect to the width direction of the through-slit.

For the through-slits formed in the respective resin fixing portions 51 described above, the aperture ratio of the through-slits is preferably made about 5 to 25% of the cross-sectional area of the lower-end fixing portion 50. In the case where the through-slits are used also for the introduction of raw water, the aperture ratio of the through-slits is preferably made about 15 to 25%, more preferably about 20%. Further in this case, for the purposes of smoothly introducing raw water and increasing the efficiency of cleaning with water, the width of the through-slits is preferably made about 1 to 8 mm, more preferably about 2 to 6 mm, and most preferably about 3 to 5 mm.

In the case where the through-slits are used only for the introduction of air, the aperture ratio of the through-slits is preferably made about 5 to 15%, more preferably about 6 to 10% in order to carry out effective air scrubbing. The use of such an aperture ratio can provide a wide spacing between membrane bundle portions, whereby inter-fiber clogging is less likely to occur. Further, sludge that has peeled off the hollow fiber membranes 10 can be efficiently discharged through the through-slits. In order to reduce the amount of air necessary for air scrubbing, the width of the through-slits is preferably made about 0.5 to 5 mm, more preferably about 1 to 3 mm, and most preferably about 1.5 to 2.5 mm.

While the formation of the through-slits 53 in the resin fixing portion 51 has been described, it is also possible to prepare a fixing portion with through-slits in accordance with the size of the lower casing 33, and to fix the fixing portion to the lower casing 33 together with the hollow fiber membranes 10.

Figure 7:
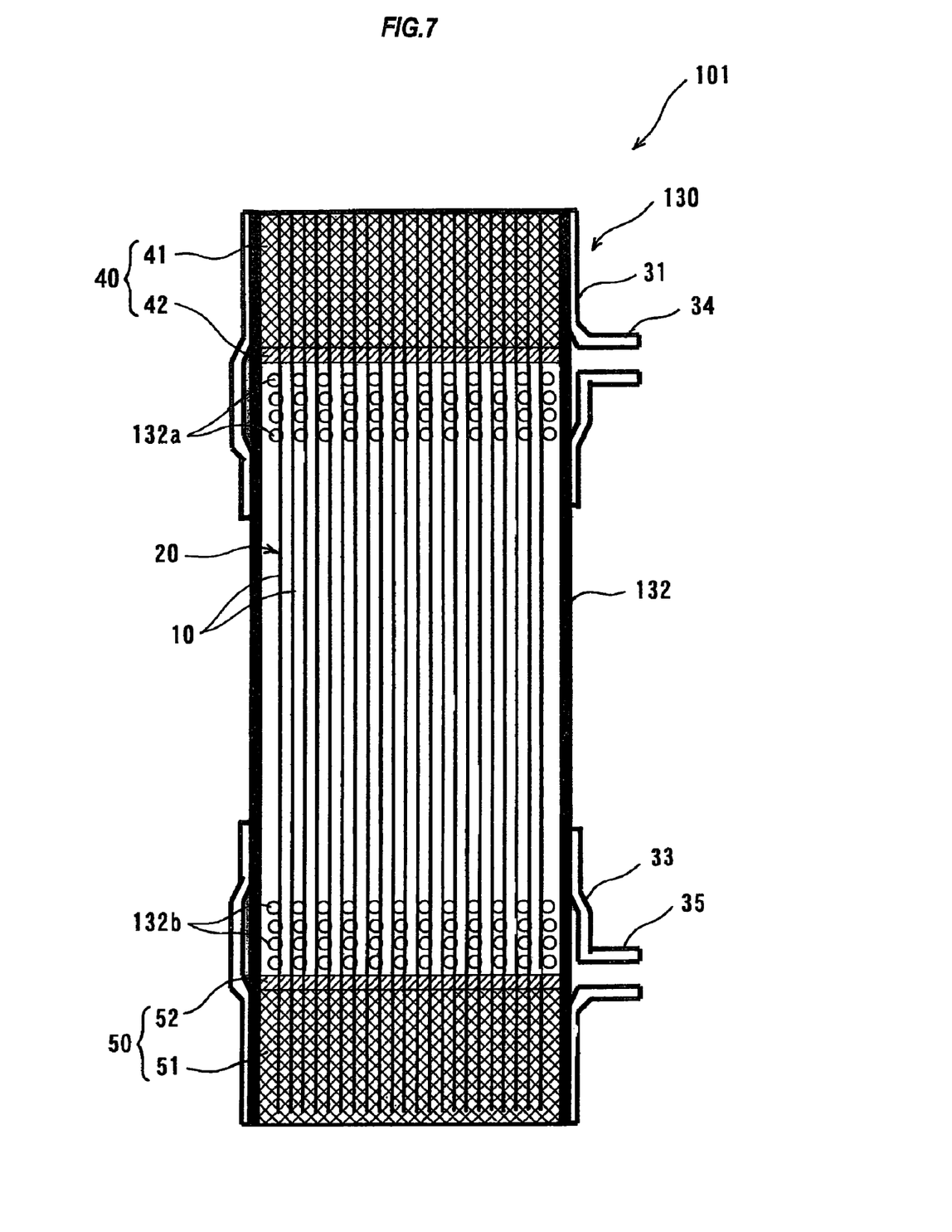
FIG. 7 is a vertical sectional view of a hollow fiber membrane module according a second embodiment of the present invention.

FIG. 7 is a vertical sectional view of a hollow fiber membrane module 101 according a second embodiment of the present invention. The hollow fiber membrane module 101 of this embodiment includes a cylindrical membrane bundle 20 of a large number of hollow fiber membranes 10, and a cylindrical body 130 housing the membrane bundle 20. The cylindrical body 130 comprises an upper casing 31, an intermediate casing 132 and a lower casing 33. The intermediate casing 132 of this embodiment extends over the full length of the membrane bundle 20, and thus differs in this respect from the intermediate casing 32 of the first embodiment. In FIG. 7, depiction of covers mounted to the upper and lower ends of the cylindrical body 30 is omitted.

Figure 8:
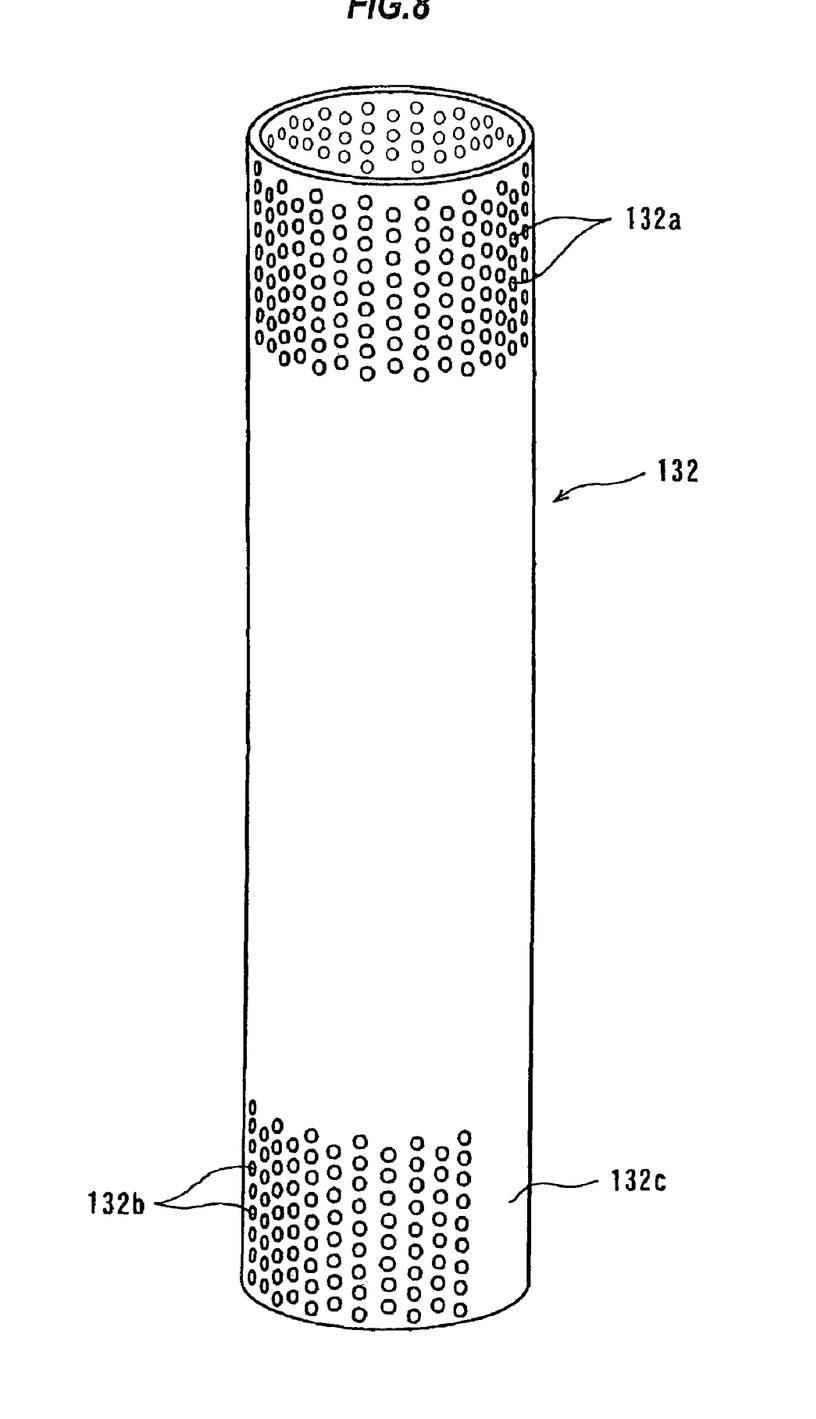
FIG. 8 is a perspective view of an intermediate casing shown in FIG. 7.

FIG. 8 is a perspective view of the intermediate casing 132. As shown in FIG. 8, a porous structure having a large number of pores 132a is provided at the upper end of the intermediate casing 132, and a porous structure having a large number of pores 132*b* is provided at the lower end of the intermediate casing 132. The porous structures having a large number of pores are thus formed in this embodiment in the vicinities of the raw water outflow nozzle 34 and of the raw water inflow nozzle 35.

The pores 132*a* of the upper-end porous structure enables uniform discharge of raw water in the cylindrical body 130 to the raw water outflow nozzle 34, while the pores 132*b* of the lower-end porous structure enables uniform supply of raw water, which flows from the raw water inflow nozzle 35 into the cylindrical body 130, to the hollow fiber membranes 10. The upper-end and lower-end porous structures can thus stabilize the flow of raw water in the cylindrical body 130. Further, the porous structures, coupled with the above-described groove(s) 43 of the soft potting portion 42 according to the first embodiment, have the effect of efficiently discharging air bubbles during air scrubbing.

Though in this embodiment the porous structures are formed integrally with the intermediate casing 132, it is also possible to form such a porous structure in a separate member from the intermediate casing 132. In this case, however, a step will be formed at a portion to which the member having a porous structure is mounted. An oscillating hollow fiber membrane 10 could be broken by its contact with such a step. The formation of such a step can be avoided by integrating a porous structure with the intermediate casing 132 as in this embodiment, thus avoiding breakage of an oscillating hollow fiber membrane 10. In addition, the structure of the hollow fiber membrane module can be simplified.

Further, with the porous structures integrated with the intermediate casing 132, when fixing the membrane bundle 20 to the cylindrical body 130 with a resin, the resin enters the pores 132*a*, 132*b* of the porous structures, whereby the intermediate casing 132, the membrane bundle 20 and the upper casing 31 can be strongly bonded together, preventing falling of the intermediate casing 132 from the upper casing 31. The strength of the hollow fiber membrane module can thus be enhanced.

It is preferred not to form pores 132*b* in that area 132*c* of the intermediate casing 132 which faces the raw water inflow nozzle 35, as shown in FIG. 8, so as to prevent direct contact of raw water, supplied from the raw water inflow nozzle 35, with the hollow fiber membranes 10. Thus, it is preferred that the area 132*c*, facing the raw water inflow nozzle 35, of the cylindrical body 130 be a continuous surface.

Figure 9:
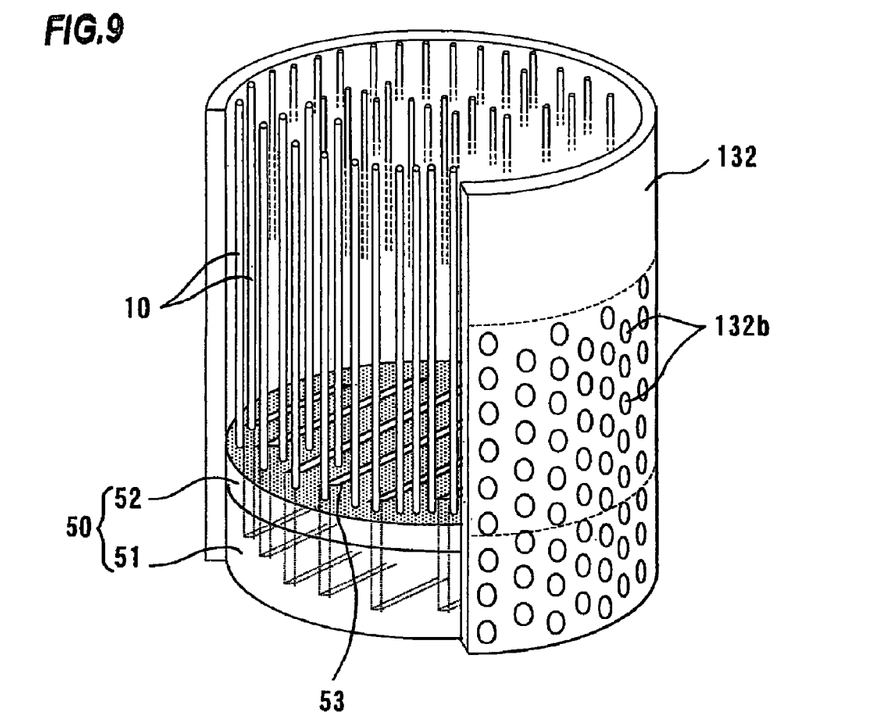
FIG. 9 is a perspective view, partly broken away, of an lower end of the hollow fiber membrane module shown in FIG. 7.

FIG. 9 is a perspective view, partly broken away, of the lower end of the hollow fiber membrane module 101. As shown in FIG. 9, as with the first embodiment, through-slits 53 are formed in the soft potting portion 52 and the resin fixing portion 51 of the lower fixing portion 50 also in this embodiment.

Figure 10:
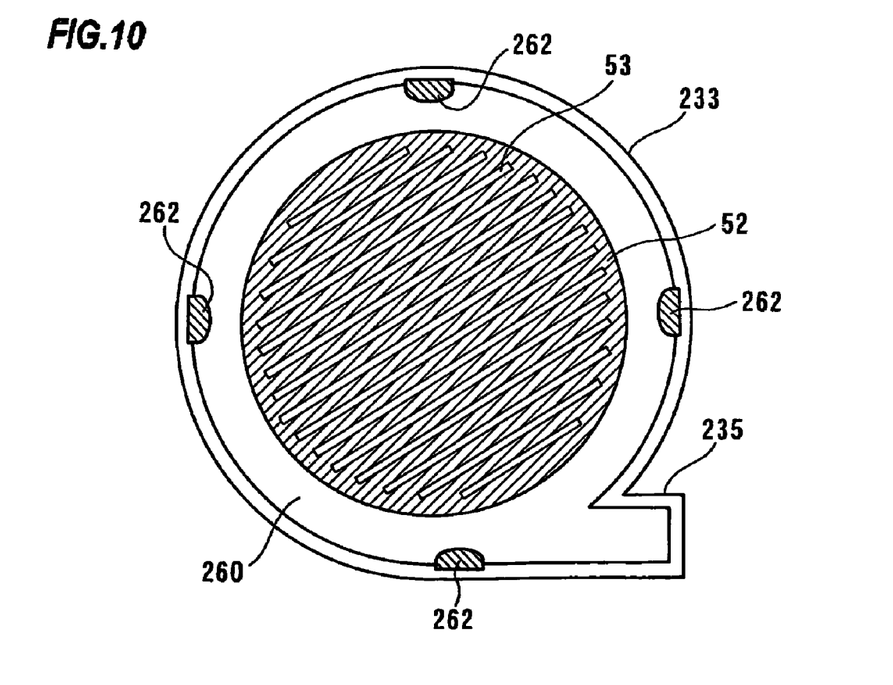
FIG. 10 is a cross-sectional view of a hollow fiber membrane module according a third embodiment of the present invention.

FIG. 10 is a cross-sectional view of a hollow fiber membrane module according a third embodiment of the present invention. As shown in FIG. 10, in this embodiment, a passage 260, extending in the circumferential direction of the lower casing 233, is formed between the lower casing 233 and the membrane bundle 20, and a raw water inflow nozzle 235, extending in the tangential direction of the lower casing 233, is provided in the lower casing 233.

With such a structure, there is no need to provide a porous structure (e.g., the pores 132*b* of FIG. 8) to reduce the flow velocity of a fast flow of raw water supplied from a raw water inflow nozzle. Further direct contact of raw water, supplied from the raw water inflow nozzle 235, with the hollow fiber membranes can be prevented by the provision of the raw water inflow nozzle 235 extending in the tangential direction of the lower casing 233. This can solve a problem peculiar to external-pressure filtration membrane modules, i.e., breakage of the hollow fiber membranes due to direct contact of the flow of raw water, supplied from the raw water inflow nozzle 235, with the hollow fiber membranes. The above structure can also be applied to a hollow fiber membrane module for cross-flow filtration.

Though there is no particular limitation on the configuration of the passage 260 between the lower casing 233 and the membrane module 20, inwardly-protruding protrusions 262 may be provided at predetermined intervals in the passage 260, as shown in FIG. 1, in order to promote disturbance and distribution of the flow of raw water in the passage 260 to thereby quickly reduce the flow velocity, thereby allowing the raw water to flow relatively uniformly in the cylindrical body. An effective swirl flow can be created by appropriately selecting the dimensions of the passage 260 and of the protrusions 262. This can make the flow of raw water in the cylindrical body more uniform.

Depending on the flow velocity of raw water flowing in from the raw water inflow nozzle 235, it is possible to make the inner diameter of the lower casing 233 larger in the vicinity of the raw water inflow nozzle 235 so as to make the passage 260, formed between the lower casing 233 and the membrane bundle 20, wider in the vicinity of the raw water inflow nozzle 235. The cylindrical body, including the lower casing 233, may have the same inner diameter throughout the entire body. In order not to produce variation in the water pressure applied on the hollow fiber membranes, however, it is preferred to decrease the inner diameter of the cylindrical body at a position immediately above the raw water inflow nozzle 235 from the inner diameter of the cylindrical body in the vicinity of the raw water inflow nozzle 235, or to gradually decrease the inner diameter of the cylindrical body upward from the inner diameter of the cylindrical body in the vicinity of the raw water flow nozzle 235.

Figure 11:
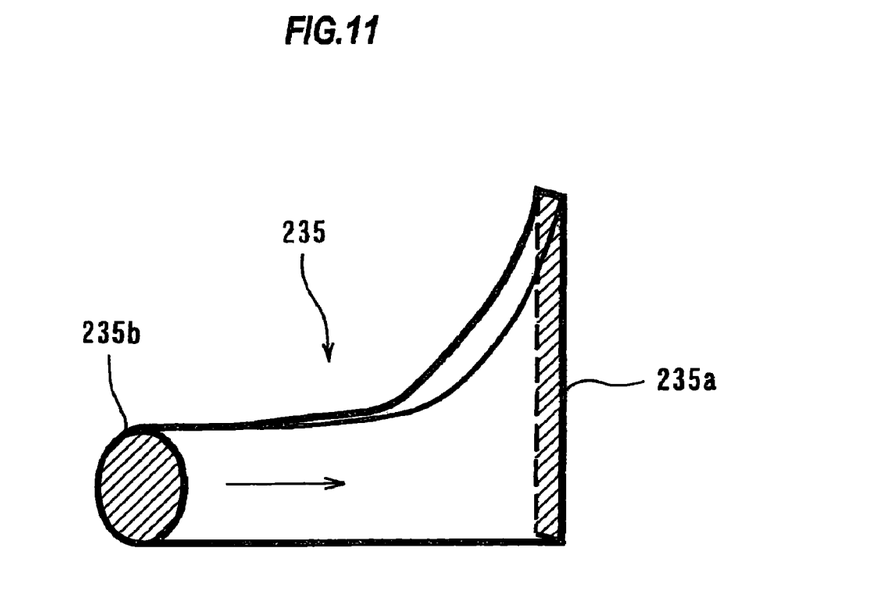
FIG. 11 is a schematic diagram showing a variation of the hollow fiber membrane module shown in FIG. 10.

A swirl flow as described above can be created also by forming a spiral passage spirally extending upward from the raw water inflow nozzle 235 instead of providing the above-described protrusions 262 in the passage 260. When it is difficult to form the passage 260 between the lower casing 233 and the membrane bundle 20, e.g., because of design limitation, or when a reduction of the flow velocity of raw water flowing into the cylindrical body is desired, it is possible to design the raw water inflow nozzle 235 such that its portion extending in the tangential direction of the lower casing 233 and connecting with the lower casing 233 has a cross-sectional shape as shown in FIG. 11. In particular, the raw water inflow nozzle 235 has, in its portion connecting with the lower casing 233, an approximately rectangular cross-sectional shape 235*a* extending in the longitudinal direction of the cylindrical body. The cross-sectional shape changes into an approximately circular shape 235*b*, which enables connection of that portion to a common external pipe, with distance from the connecting portion with the lower casing 233.

In this case, the raw water inflow nozzle 235 is preferably constructed such that the area of the approximately rectangular cross-sectional shape 235*a* is equal to or larger than the area of the approximately circular cross-sectional shape 235*b*. This can solve the above-described problems.

In the case of gradually increasing the cross-sectional area of the raw water inflow nozzle 235 from the area of the approximately circular shape 235*b* to the area of the approximately rectangular shape 235*a*, a protruding structure for disturbing the flow of raw water or a porous plate for reducing the flow velocity of raw water flowing into the cylindrical body may be provided on the inner wall of the raw water inflow nozzle 235.

Figure 12:
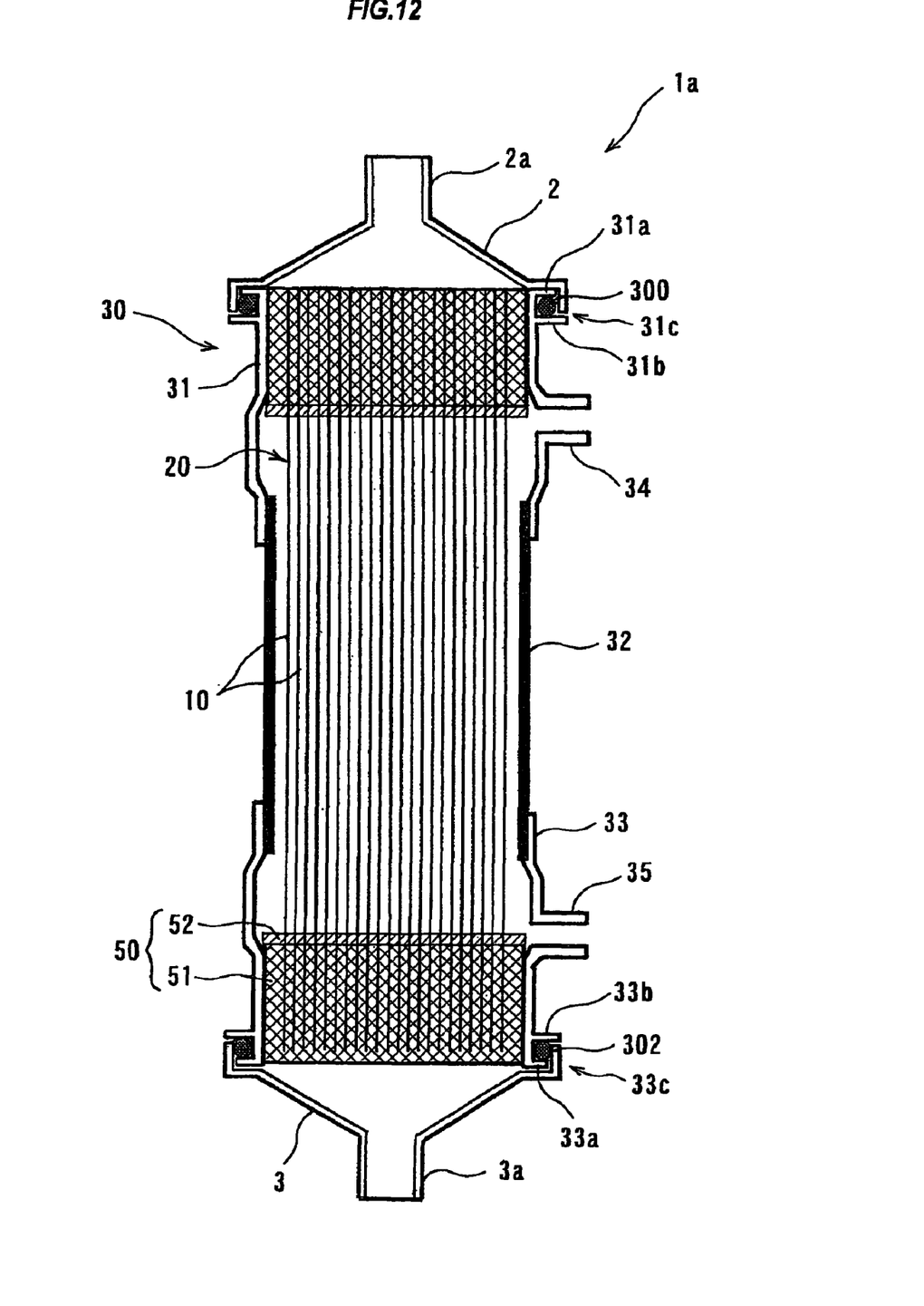
FIG. 12 is a cross-sectional view of a variation of the hollow fiber membrane module shown in FIG. 1.

FIG. 12 is a cross-sectional view of a variation of the hollow fiber membrane module shown in FIG. 1. In this variation, the space between the upper cover 2 and the upper casing 31 is sealed with a sealing member (O-ring) 300, and the space between the lower cover 3 and the lower casing 33 is sealed with a sealing member (O-ring) 302. The sealing member 300 is disposed radially outside the upper casing 31, and the sealing member 302 is disposed radially outside the lower casing 33.

As shown in FIG. 12, a first locking piece 31a extending radially outward is provided at the upper end of the upper casing 31 to which the upper cover 2 is connected, and a second locking piece 31b extending radially outward is provided below the first locking piece 31a. The width of the first locking piece 31a is smaller than that of the second locking piece 31b. A sealing member housing portion 31c for housing the sealing member 300 is formed by the locking pieces 31a, 31b at the upper end of the outer circumferential surface of the upper casing 31. Instead of providing such locking pieces 31a, 31b, a recess (groove) for housing the sealing member 300 may be formed at the upper end of the outer circumferential surface of the upper casing 31.

Similarly, a first locking piece 33a extending radially outward is provided at the lower end of the lower casing 33 to which the lower cover 3 is connected, and a second locking piece 33b extending radially outward is provided above the first locking piece 33a. The width of the first locking piece 33a is smaller than that of the second locking piece 33b. A sealing member housing portion 33c for housing the sealing member 302 is formed by the locking pieces 33a, 33b at the lower end of the outer circumferential surface of the lower casing 33. Instead of providing such locking pieces 33a, 33b, a recess (groove) for housing the sealing member 302 may be formed at the lower end of the outer circumferential surface of the lower casing 33.

With the provision of such sealing members 300, 302, even when the covers 2, 3 are somewhat displaced axially due to pressurization in the hollow fiber membrane module, the sealing members 300, 302 can keep contact with the outer circumferential surfaces of the casings 31, 33, thus securely keeping sealing between the casings and the covers. If sealing members are disposed at the ends of the covers 2, 3 in the axial direction, on the other hand, problems, such as leakage, may occur when the covers 2, 3 are displaced axially due to pressurization in the hollow fiber membrane module.

Further, the above-described manner of provision of the sealing members 300, 302 makes it possible to connect the covers 2, 3 to the casings 31, 33, not by such a method as screwing or adhesion, but by a simple method as clamping. This enables simplification of the structure of the hollow fiber membrane module. Further, when the covers 2, 3 are connected to the casings 31, 33 by such a method as clamping, displacement or removal of the hollow fiber membranes 10 can be performed by displacing or removing only the cylindrical body 30. This facilitates displacement or removal of the hollow fiber membranes 10. Such a seal structure can be employed not only for external-pressure filtration, but for internal-pressure filtration as well.

Though in the embodiment shown in FIG. 12 the sealing members 300, 302 are disposed radially outside the casings 31, 33, it is also possible to dispose the sealing members 300, 302 radially inside the casings 31, 33.

Example 1

An experiment was conducted using a hollow fiber membrane module having the below-described construction. Porous hollow fiber membranes having a nominal pore size of 0.1 μm were used as the hollow fiber membranes 10, and a cylindrical pipe having an inner diameter of 150 mm was used as the intermediate casing 132. Porous structures were formed at both ends of the casing 132. A bundle of the hollow fiber membranes 10, the both ends of the bundle being fixed with a resin, was packed into a cylindrical body 130. A groove 43 having a width of 20 mm and a depth of 10 mm was formed in that area of the upper-end fixing portion 40 which makes contact with raw water. The groove 43 extends toward the raw water outflow nozzle 34 of the upper casing 31, as shown in FIG. 3.

Using the hollow fiber membrane module of the external-pressure type thus fabricated, the following normal-flow filtration test was conducted. First, filtration of raw water was carried out for 15 minutes by supplying pure water from below the lower-end fixing portion 50 through through-slits into the cylindrical body 130. Thereafter, while carrying out reverse cleaning with filtrate water, air scrubbing was carried out for 30 seconds by supplying air from the nozzle 3a of the lower cover 3 through the through-slits into the cylindrical body 130. Thereafter, water in the cylindrical body 130 was discharged for 30 seconds. A two-week continuous flow test was conducted by repeating the cycle of these steps. As a result, the amount of filtrate water after two weeks was 99% of the initial amount of filtrate water, indicating almost no lowering of the flux.

Comparative Example 1

A two-week continuous flow test was conducted under the same operating conditions as in Example 1, using a hollow fiber membrane module which was the same as that used in Example 1 except that no groove was formed in the upper-end fixing portion 40. As a result, the amount of filtrate water after two weeks decreased to 93% of the initial amount of filtrate water. When the hollow fiber membrane module was disassembled to observe the hollow fiber membranes, the hollow fiber membranes were found to be partly in a dry state at the upper end of the module. From this fact, the cause of the decrease in the amount of filtrate water is considered to be as follows: Air bubbles produced upon air scrubbing were not fully discharged and remained in the upper end of the module during filtration, whereby the hollow fiber membranes became dried and hydrophobic, leading to a decrease in the effective membrane area.

Example 2

An experiment was conducted using a hollow fiber membrane module having the below-described construction. Porous hollow fiber membranes having a nominal pore size of 0.1 μm were used as the hollow fiber membranes 10, and a rigid polyvinyl chloride pipe having an inner diameter of 150 mm was used as the intermediate casing 132. Porous structures were formed at both ends of the casing 132. A bundle of the hollow fiber membranes 10, the both ends of the bundle being fixed with a resin, was packed into a cylindrical body 130. A groove 43 having a width of 20 mm and a depth of 10 mm was formed in that area of the upper-end fixing portion 40 which makes contact with raw water. The groove 43 extends toward the raw water outflow nozzle 34 of the upper casing 31, as shown in FIG. 3. Ten through-slits 53 having a width of 3 mm were formed in the resin fixing portion 51 and the soft potting portion 52 of the lower fixing portion 50, as shown in FIG. 5, so that air for air scrubbing as well as raw water would be supplied through the through-slits 53. The aperture ratio of the through-slits 53 was about 20% of the cross-sectional area of the lower-end fixing portion 50.

Using the hollow fiber membrane module of the external-pressure type thus fabricated, the following normal-flow filtration test was conducted using, as raw water, river surface water whose turbidity changes in the range of 2 to 11. First, filtration of raw water was carried out for one hour by supplying raw water from below the lower-end fixing portion 50 through the through-slits 53 into the cylindrical body 130. Thereafter, while carrying out reverse cleaning with filtrate water, air scrubbing was carried out for 30 seconds by supplying air from the nozzle 3a of the lower cover 3 through the through-slits 53 into the cylindrical body 130. Thereafter, water in the cylindrical body 130 was discharged through the through-slits 53 for 30 seconds. A one-month continuous flow test was conducted by repeating the cycle of these steps. As a result, the amount of filtrate water after 750 hours was 81% of the initial amount of filtrate water.

Comparative Example 2

A continuous flow test was conducted under the same operating conditions as in Example 2, using a hollow fiber membrane module which was the same as that used in Example 2 except that instead of the through-slits 53, circular openings were formed in the lower-end fixing portion 50. The number of the circular openings was 32 and the diameter was 10 mm. As in Example 2, the aperture ratio of the circular openings was about 20% of the cross-sectional area of the lower-end fixing portion 50. As a result, the amount of filtrate water after 750 hours decreased to 58% of the initial amount of filtrate water. Thus, the lowering of the flux was significant as compared to Example 2.

Example 3

An experiment was conducted using a hollow fiber membrane module having the below-described construction. Porous hollow fiber membranes having a nominal pore size of 0.1 µm were used as the hollow fiber membranes 10, and a rigid polyvinyl chloride pipe having an inner diameter of 150 mm was used as the intermediate casing 132. Porous structures were formed at both ends of the casing 132. A bundle of the hollow fiber membranes 10, the both ends of the bundle being fixed with a resin, was packed into a cylindrical body 130. A groove 43 having a width of 20 mm and a depth of 10 mm was formed in that area of the upper-end fixing portion 40 which makes contact with raw water. The groove 43 extends toward the raw water outflow nozzle 34 of the upper casing 31, as shown in FIG. 3. Ten through-slits 53 having a width of 3 mm were formed in the resin fixing portion 51 and the soft potting portion 52 of the lower fixing portion 50, as shown in FIG. 5, so that air for air scrubbing as well as raw water would be supplied through the through-slits 53. The aperture ratio of the through-slits 53 was about 20% of the cross-sectional area of the lower-end fixing portion 50.

Using the hollow fiber membrane module of the external-pressure type thus fabricated, the following normal-flow filtration test was conducted using, as raw water, river surface water whose turbidity changes in the range of 2 to 11. First, filtration of raw water was carried out for one hour by supplying raw water from below the lower-end fixing portion 50 through the through-slits 53 into the cylindrical body 130. Thereafter, while carrying out reverse cleaning with filtrate water, air scrubbing was carried out for 30 seconds by supplying air from the nozzle 3a of the lower cover 3 through the through-slits 53 into the cylindrical body 130. Thereafter, water in the cylindrical body 130 was discharged through the through-slits 53 for 30 seconds. A one-month continuous flow test was conducted by repeating the cycle of these steps. As a result, the amount of filtrate water after 750 hours was 86% of the initial amount of filtrate water.

Comparative Example 3

A continuous flow test was conducted under the same operating conditions as in Example 3, using a hollow fiber membrane module which was the same as that used in Example 3 except that instead of the through-slits 53, circular openings were formed in the lower-end fixing portion 50. The number of the circular openings was 32 and the diameter was 10 mm. As in Example 3, the aperture ratio of the circular openings was about 20% of the cross-sectional area of the lower-end fixing portion 50. As a result, the amount of filtrate water after 750 hours decreased to 72% of the initial amount of filtrate water. Thus, the lowering of the flux was significant as compared to Example 2.

While the present invention has been described with reference to the embodiments thereof, it will be understood by those skilled in the art that the present invention is not limited to the particular embodiments described above, but it is intended to cover modifications within the inventive concept.

INDUSTRIAL APPLICABILITY

The hollow fiber membrane module of the present invention can be advantageously used in the purification of clean water, drinking water, industrial water, pure water, or the like, in the clarification of river water, sea water, or the like, in the treatment of various types of wastewater, human waste, sewage water, or the like, and in a water treatment, such as slurry condensation, of sludge or the like.

The invention claimed is:
1. A hollow fiber membrane module comprising:
   a membrane bundle of a plurality of hollow fiber membranes;
   a cylindrical body housing the membrane bundle;
   a raw water outflow-side fixing portion in which a raw water outflow-side end of the membrane bundle is fixed to the cylindrical body;
   a raw water outflow nozzle for allowing raw water to flow out from a vicinity of the raw water outflow-side fixing portion;
   a raw water inflow-side fixing portion in which a raw water inflow-side end of the membrane bundle is fixed to the cylindrical body; and
   a raw water inflow nozzle for allowing raw water to flow in from a vicinity of the raw water inflow-side fixing portion, the raw water supplied into the cylindrical body being allowed to permeate from an outside into an inside of each hollow fiber membrane,
   wherein the raw water outflow-side fixing portion has at least one groove in a portion of the raw water outflow-side fixing portion which is to be in contact with the raw water, wherein at least part of the at least one groove of the raw water outflow-side fixing portion communicates with the raw water outflow nozzle, the at least one groove having a depth of 5 to 20 mm, a bottom of the at least one groove having an area which is 5 to 25% of a cross-sectional area of the raw water outflow-side fixing portion, and
   wherein the raw water inflow-side fixing portion includes, in a portion of the raw water inflow-side fixing portion which is to be in contact with the raw water, a plurality of through-slits and a plurality of fixed membrane bundle portions extending approximately parallel to the through-slits, wherein an aperture ratio of the through-slits is 5 to 25% of a cross-sectional area of the raw water inflow-side fixing portion, the through-slits having a width of 1 to 8 mm.

2. The hollow fiber membrane module according to claim 1, wherein at least part of said at least one groove of the raw water outflow-side fixing portion is inclined toward the raw water outflow nozzle.

3. The hollow fiber membrane module according claim 1, wherein the cylindrical body has porous structures, each having a large number of pores, formed in vicinities of the raw water outflow nozzle and of the raw water inflow nozzle, with no pore being formed in an area of the cylindrical body which faces the raw water inflow nozzle.

4. The hollow fiber membrane module according to claim 3, wherein the raw water outflow-side fixing portion and the raw water inflow-side fixing portion fix the ends of the membrane bundle with a resin to the porous structures of the cylindrical body.

5. The hollow fiber membrane module according to claim 1, further comprising:
covers connected to both ends of the cylindrical body, and
sealing members, provided outside or inside the cylindrical body, for sealing between the cylindrical body and the covers.

6. The hollow fiber membrane module according to claim 5, wherein the cylindrical body has sealing member housing portions for housing the sealing members.

7. The hollow fiber membrane module according to claim 1, wherein the depth of the at least one groove is 10 to 15 mm, and the area of the bottom of the at least one groove is 15 to 20% of the cross-sectional area of the raw water outflow-side fixing portion.

8. The hollow fiber membrane module according to claim 1, wherein the aperture ratio of the through-slits is 15 to 25% of the cross-sectional area of the raw water inflow-side fixing portion, and the width of the through-slits is 3-5 mm.

9. The hollow fiber membrane module according to claim 1, wherein the aperture ratio of the through-slits is 5 to 15% of the cross-sectional area of the raw water inflow-side fixing portion, and the width of the through-slits is 1.5 to 2.5 mm.

* * * * *